(12) United States Patent
Benensky et al.

(10) Patent No.: US 11,015,338 B2
(45) Date of Patent: *May 25, 2021

(54) ROOFING SHINGLES AND METHODS FOR INSTALLING AND MAKING THEM

(71) Applicant: CertainTeed LLC, Malvern, PA (US)

(72) Inventors: Paul Benensky, Collegeville, PA (US); Nicholas David Orf, Natick, MA (US); Gregory F. Jacobs, Oreland, PA (US); Flavien Fremy, Brookline, MA (US)

(73) Assignee: CertainTeed LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,380

(22) Filed: May 11, 2020

(65) Prior Publication Data

US 2020/0270862 A1    Aug. 27, 2020

Related U.S. Application Data

(63) Continuation of application No. 16/147,059, filed on Sep. 28, 2018, now Pat. No. 10,676,921.

(60) Provisional application No. 62/565,001, filed on Sep. 28, 2017.

(51) Int. Cl.
| | |
|---|---|
| *E04B 1/94* | (2006.01) |
| *E04D 1/26* | (2006.01) |
| *E04D 1/28* | (2006.01) |
| *B32B 3/26* | (2006.01) |
| *B32B 11/04* | (2006.01) |

(52) U.S. Cl.
CPC .............. *E04B 1/942* (2013.01); *B32B 3/26* (2013.01); *B32B 11/04* (2013.01); *E04D 1/26* (2013.01); *E04D 1/28* (2013.01); *B32B 2250/02* (2013.01); *B32B 2419/06* (2013.01)

(58) Field of Classification Search
CPC .................................. E04D 1/26; B32B 11/04
See application file for complete search history.

(56) References Cited

U.S. PATENT DOCUMENTS

| | | | |
|---|---|---|---|
| 1,894,614 | A | 1/1993 | Wettlaufer |
| 6,510,664 | B2 | 1/2003 | Kupczyk |
| 9,157,236 | B2 | 10/2015 | Jenkins |
| 2003/0163964 | A1 | 9/2003 | Elliot |
| 2016/0177569 | A1 | 6/2016 | Leitch |
| 2019/0093344 | A1 | 3/2019 | Benensky |

OTHER PUBLICATIONS

Copending U.S. Appl. No. 16/147,059, filed Sep. 28, 2018.

*Primary Examiner* — Patrick J Maestri
(74) *Attorney, Agent, or Firm* — McDonnell Boehnen Hulbert & Berghoff LLP

(57) ABSTRACT

One aspect of the disclosure is a shingle including a first bituminous sheet at the bottom surface of the shingle, the first bituminous sheet having a lower edge disposed at the lower end of the shingle, the first bituminous sheet having one or more slits extending from the lower edge of the first bituminous sheet toward the upper end of the shingle; and a second bituminous sheet at least partially laminated to a top surface of the first bituminous sheet, the second bituminous sheet having a lower edge disposed adjacent the lower end of the shingle, the second bituminous sheet having one or more tabs being defined by one or more notches formed in the second bituminous sheet, each notch extending away from the lower edge of the second bituminous sheet.

21 Claims, 15 Drawing Sheets

ROOFING SHINGLES AND METHODS FOR INSTALLING AND MAKING THEM

CROSS-REFERENCE TO RELATED APPLICATIONS

This application is a continuation of U.S. patent application Ser. No. 16/147,059, filed Sep. 28, 2019, which claims the benefit of priority of U.S. Provisional Patent Application No. 62/565,001, filed Sep. 28, 2017, each of which is hereby incorporated herein by reference in its entirety.

BACKGROUND OF THE DISCLOSURE

1. Field of the Disclosure

The present disclosure relates generally to roofing shingles and methods for installing them. The present disclosure relates more particularly to multi-layered roofing shingles having one or more slits on a surface that is designed to face a roof deck.

2. Technical Background

The two most common types of bituminous (e.g., asphalt) roofing shingles are three-tab shingles and architectural or "laminated" shingles. Three-tab shingles are generally formed from a single bituminous sheet having an exposure zone and a headlap zone, with three distinct "tabs" defined by two elongated notches between the tabs. The notches extend from a bottom edge of the shingle, through at least part of the exposure zone toward the headlap zone. The shingles are laid in lateral rows on a roof in an edge-to-edge manner. The exposure zones of an upper row of shingles are generally installed over the headlap zones of a lower row of shingles in a repeating pattern. Three tab shingles are generally fastened to the roof deck with fasteners such as nails.

Architectural shingles also generally have an exposure zone and a headlap zone. The exposure zone is typically composed of a top bituminous sheet that includes tabs (e.g., so-called "dragon's teeth") that cover respective portions of a continuous bottom bituminous sheet. The headlap is typically composed solely or mostly of the top bituminous sheet. The top and bottom sheets are laminated together to present a layered appearance. Architectural shingles are also generally installed with overlapping lateral rows and are also generally fastened to the roof deck with fasteners such as nails.

Although architectural shingles are generally considered more durable and more aesthetically pleasing than three tab shingles, in some instances they may present a less robust barrier to fire. A fire that burns on top of a roof may cause architectural shingles to undergo thermal expansion. This can cause one or more architectural shingles to buckle, pinch, or pucker such that a portion of the shingle pulls away from the roof deck (e.g., forming a "tunnel). This tunnel facilitates air movement underneath the shingles, making it easier for the underlying wood roof deck to ignite from the combination of heat from flame and oxygen from the air.

Accordingly, what are needed are architectural (e.g., laminated) shingles that provide improved protection against fire.

SUMMARY OF THE DISCLOSURE

One aspect of the disclosure is a roofing shingle having a bottom surface, the roofing shingle having an exposure zone at a lower end thereof and a headlap zone at an upper end thereof, the roofing shingle comprising:
  a first bituminous sheet disposed at the bottom surface of the shingle in the exposure zone thereof, the first bituminous sheet having a lower edge disposed at the lower end of the roofing shingle, the first bituminous sheet having one or more slits formed therein, each of the one or more slits extending from the lower edge of the first bituminous sheet toward the upper end of the roofing shingle; and
  a second bituminous sheet at least partially laminated to a top surface of the first bituminous sheet, the second bituminous sheet having a lower edge disposed at the lower end of the roofing shingle, the second bituminous sheet having one or more tabs formed in the exposure zone of the shingle, the one or more tabs being defined by one or more notches formed in the second bituminous sheet, each notch extending away from the lower edge of the second bituminous sheet.

In certain such embodiments, the slits of the first bituminous sheet are substantially different from the notches of the second bituminous sheet.

Another aspect of the disclosure is a bundle of a plurality of shingles as described herein.

Another aspect of the disclosure is a roof comprising a roof deck having an upper end and a lower end, and a plurality of roofing shingles as described herein disposed thereon, the roofing shingles being disposed in a first course of a first plurality of the shingles and a second course of a second plurality of the shingles, the second course of shingles overlapping the headlap zones of the shingles of the first course of shingles, the headlap zones of the roofing shingles being disposed toward the upper end of the roof and the exposure zones of the roofing shingles being disposed toward the lower end of the roof.

Another aspect of the disclosure is a method for installing a roof, including
  fastening a first plurality of shingles as described herein to a roof deck in a laterally edge-to-edge manner to form a first course, and
  fastening a second plurality of shingles as described herein to the roof deck in a laterally edge-to-edge manner, disposed such that the second course of shingles overlaps the headlap zones of the shingles of the first course of shingles.

Another aspect of the disclosure is a method for making a roofing shingle as described herein. The method includes:
  providing
    a first bituminous sheet having a lower edge disposed at the lower end of the roofing shingle, the first bituminous sheet having one or more slits formed therein, each of the one or more slits extending from the lower edge of the first bituminous sheet toward the upper end of the first bituminous sheet; and
    a second bituminous sheet having a lower edge, the second bituminous sheet having one or more tabs formed in an exposure zone, the one or more tabs being defined by one or more notches formed in the second bituminous sheet, each notch extending away from the lower edge of the second bituminous sheet; and
  at least partially laminating the second bituminous sheet to a top surface of the first bituminous sheet to form the roofing shingle.

Another aspect of the disclosure is a method for making a roofing shingle as described herein. The method includes:

providing a roofing shingle having a bottom surface, the roofing shingle having an exposure zone at a lower end thereof and a headlap zone at an upper end thereof, the roofing shingle comprising
  a first bituminous sheet disposed at the bottom surface of the shingle in the exposure zone thereof, the first bituminous sheet having a lower edge disposed at the lower end of the roofing shingle; and
  a second bituminous sheet at least partially laminated to a top surface of the first bituminous sheet, the second bituminous sheet having a lower edge disposed at the lower end of the roofing shingle, the second bituminous sheet having one or more tabs formed in the exposure zone of the shingle, the one or more tabs being defined by one or more notches formed in the second bituminous sheet, each notch extending away from the lower edge of the second bituminous sheet; and
forming one or more slits in the first bituminous sheet, each of the one or more slits extending from the lower edge of the first bituminous sheet toward the upper end of the roofing shingle.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted disadvantages of conventional architectural or "laminated" shingles. As noted above, installed architectural shingles that are exposed to fire often will buckle up and away from the roof deck which can open a "tunnel" or passageway for air flow against the roof deck. Since roof decks are usually constructed of wood, this undesirably facilitates ignition of the deck and can further fuel the fire. The present inventors have noted that conventional architectural shingles have a continuous bottom sheet, which lacks features that can accommodate planar thermal expansion under the high-heat conditions of the fire. The present inventors have determined that forming one or more slits in the bottom sheet of an architectural roofing shingle can provide strain relief when the material of the shingle expands (e.g., by allowing different sections of the shingle to slide over one another), and thus prevent the buckling suffered by conventional architectural shingles.

Accordingly, one aspect of the disclosure is a roofing shingle having a bottom surface, an exposure zone at a lower end thereof, and a headlap zone at an upper end thereof. The roofing shingle includes a first bituminous sheet disposed at the bottom surface of the shingle in the exposure zone. The first bituminous sheet has a lower edge disposed at the lower end of the roofing shingle and has one or more slits formed therein. Each of the one or more slits extends from the lower edge of the first bituminous sheet toward the upper end of the roofing shingle. The roofing shingle also includes a second bituminous sheet at least partially laminated to a top surface of the first bituminous sheet. The second bituminous sheet has a lower edge disposed at the lower end of the roofing shingle and one or more tabs formed in the exposure zone of the shingle. The one or more tabs are defined by one or more notches formed in the second bituminous sheet. Each notch extends away from the lower edge of the second bituminous sheet.

In the event of fire, the roofing shingles of the disclosure are more likely to remain somewhat flush against the roof deck due to the one or more slits within the first bituminous sheet that faces the roof deck. The discontinuity provided by the one or more slits allows, for example, a portion of the first bituminous sheet to the right of the slit to expand and slide over a portion of the first bituminous sheet to the left of the slit, or vice versa. That is, the slits allow the first bituminous sheet that faces and shields the roof deck to relieve strain through expansion and slippage of adjacent sections over one another, instead of forcing the shingle to buckle and expand upward.

Figure 1:
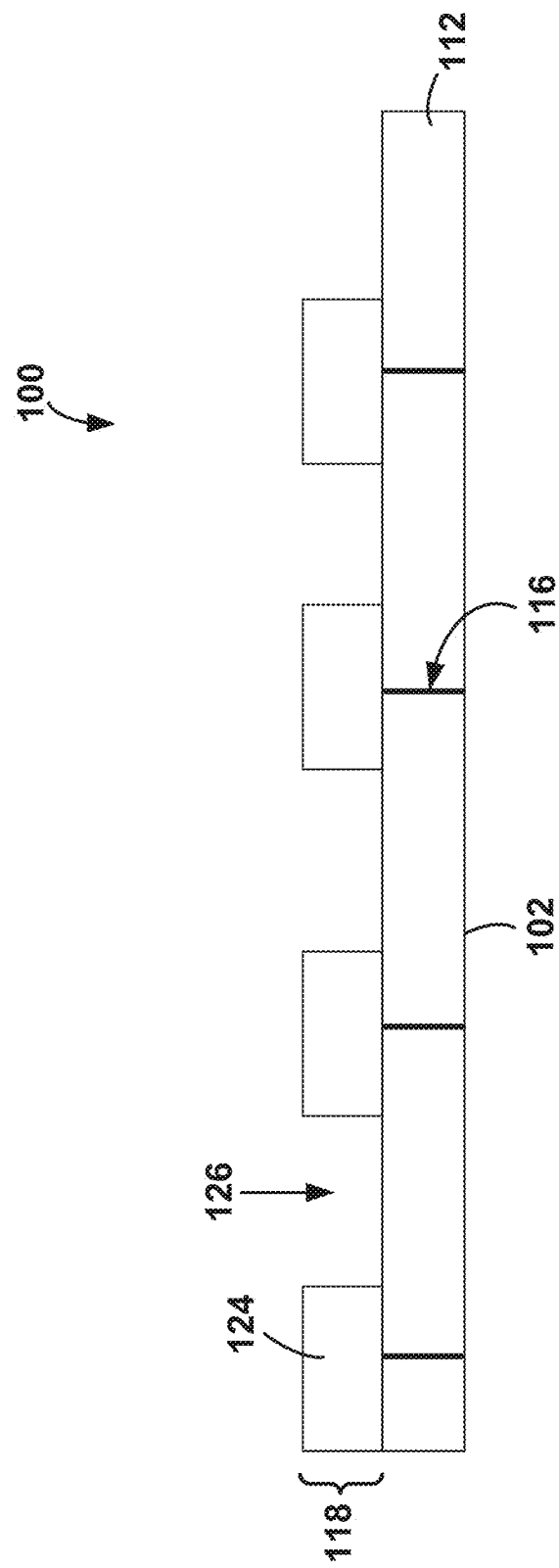
FIG. 1 is a schematic cross-sectional of a shingle in its exposure zone according to one embodiment of the disclosure.
Figure 2:
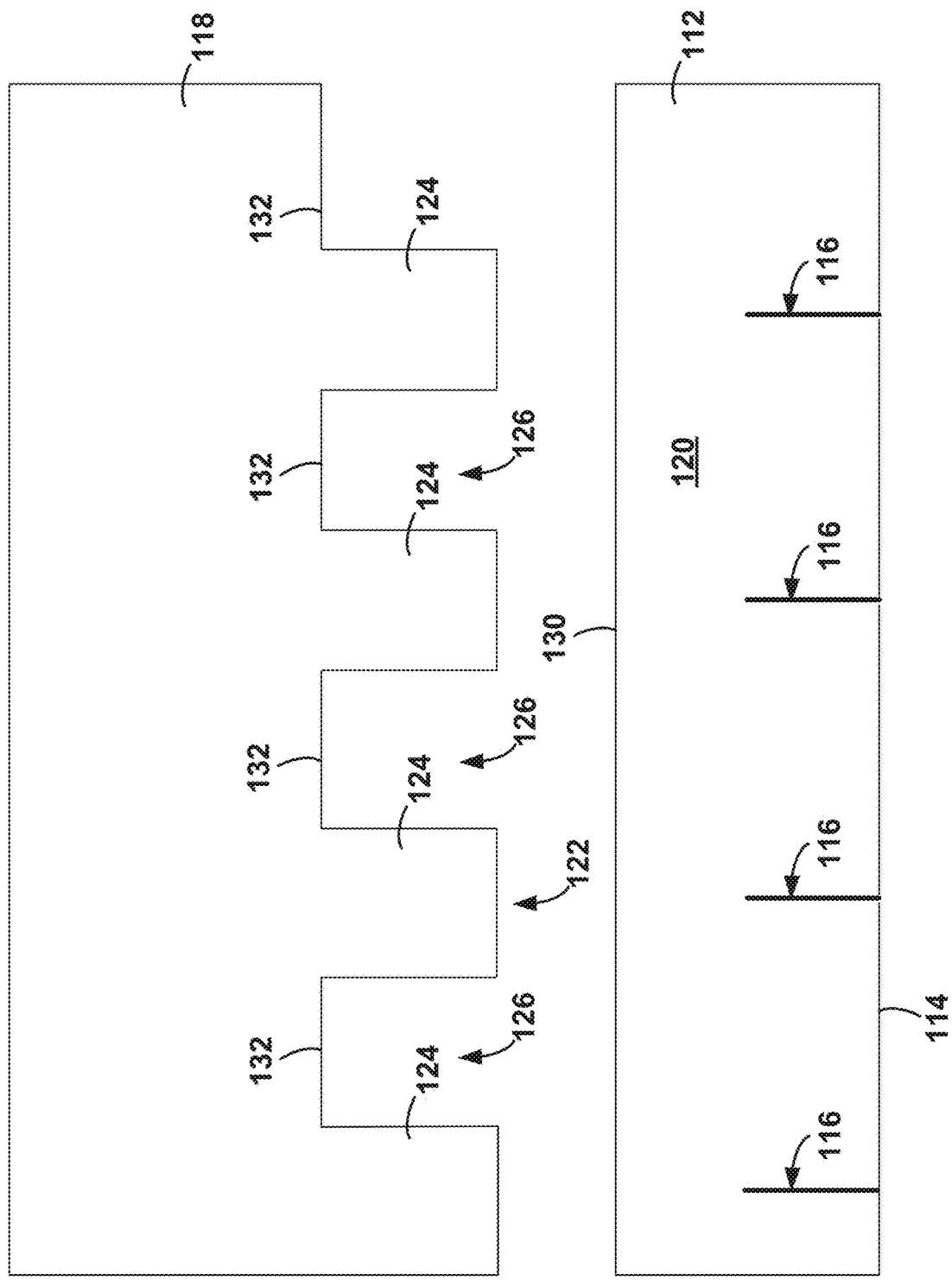
FIG. 2 is a schematic exploded top view of a shingle according to the embodiment of FIG. 1.
Figure 3:
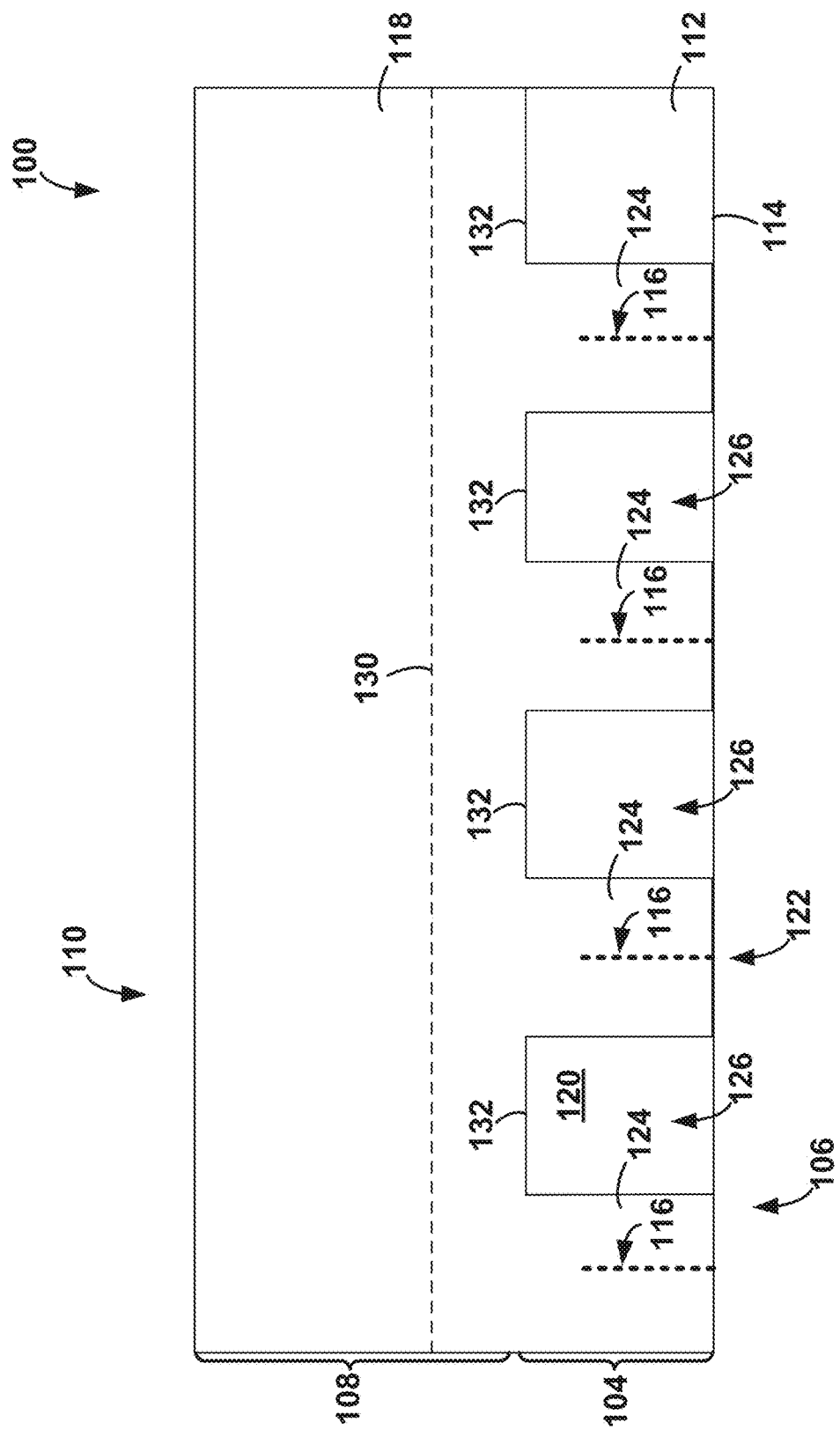
FIG. 3 is a schematic top view of a shingle according to the embodiment of FIG. 1.

One embodiment of such a roofing shingle is described with respect to FIGS. 1-3 below. FIGS. 1-3 each show a different view of the roofing shingle 100, with FIG. 1 being a schematic cross-sectional view of the shingle in its exposure zone, FIG. 2 being a schematic exploded top view of the shingle, and FIG. 3 being a schematic top view of the shingle (i.e., as assembled). As shown in FIG. 1, the roofing shingle 100 has a bottom surface 102 formed from a first bituminous sheet 112 (e.g., a bitumen-coated fiberglass or felt mat) and a second bituminous sheet 118 (e.g., a bitumen-coated fiberglass or felt mat). As shown in FIG. 3, the roofing shingle 100 has an exposure zone 104 at a lower end 106 thereof and a headlap zone 108 at an upper end 110 thereof. As shown in FIG. 3, the roofing shingle 100 includes the first bituminous sheet 112 disposed at the bottom surface 102 of the roofing shingle 100 in the exposure zone 104 thereof. The first bituminous sheet 112 has a lower edge 114 disposed at the lower end 106 of the roofing shingle 100. The first bituminous sheet 112 has one or more slits 116 (e.g., in the range of 2 to 6 slits) formed therein. Each of the one or more slits 116 extends from the lower edge 114 of the first bituminous sheet 112 toward the upper end 110 of the roofing shingle 100. The roofing shingle 100 further includes a second bituminous sheet 118 at least partially laminated to a top surface 120 of the first bituminous sheet 112. The second bituminous sheet 118 has a lower edge 122 disposed at the lower end 106 of the roofing shingle 100. The second bituminous sheet 118 has one or more tabs 124 formed in the exposure zone 104 of the roofing shingle 100. The one or more tabs 124 are defined by one or more notches 126 (e.g., in the range of 1 to 6 notches) formed in the second bituminous sheet 118. Each notch of the one or more notches 126 extends away from the lower edge 122 of the second bituminous sheet 118.

In certain embodiments as described herein, the slits of the first bituminous sheet are substantially different from the notches of the second bituminous sheet. As used herein, "substantially different" means "observably different via visual inspection." For example, the dimensions of the one or more slits 116 of the first bituminous sheet 112 are noticeably different from the dimensions of the one or more notches 126 of the second bituminous sheet 118 in both length and width, as depicted in FIG. 3.

As the person of ordinary skill in the art will appreciate, conventional shingle materials can be used in the shingles of the present disclosure. For example, the first bituminous sheet and the second bituminous sheet may be formed from respective fiberglass mats that are coated with asphalt and weather-resistant roofing granules. Such mats may be formed with other conventional materials known to one of ordinary skill in the art as well. The one or more slits, one or more tabs, and one or more notches may be formed in the first bituminous sheet and the second bituminous sheet by cutting (e.g., via a knife, such as on those on a knife roll) into the sheets, for example, after they are formed but before the sheets are laminated together. Once the first bituminous sheet and the second bituminous sheet are formed, they can be laminated together using conventional methods (e.g., being aligned with each other affixed to one another with an adhesive). Accordingly, in certain embodiments of the shingles as otherwise described herein, the second bituminous sheet is affixed to the first bituminous sheet with an adhesive, e.g., a hot-melt adhesive or an asphaltic laminating adhesive.

In certain embodiments of the shingles as otherwise described herein, at least one of the one or more slits of the first bituminous sheet (e.g., each of the one or more slits of the first bituminous sheet) is covered by the second bituminous sheet. As shown in FIG. 3, the one or more tabs 124 cover respective slits of the one or more slits 116. In some examples, at least one of the one or more slits is covered by a portion of the second bituminous sheet other than the one or more tabs. The present inventors have noted that, while a slit having a tab adhered over it may not provide much strain relief at normal atmospheric temperatures, when the shingle is involved in a fire, the adhesive adhering the tab can melt, which allows the first bituminous sheet to move relative to the second bituminous sheet in the region of the slit. Thus, the presence of the tab does not interfere with the strain relief operation of the slit under the high-heat conditions of the fire. Having a slit under a tab can be advantageous for at least a couple of reasons. First, the slit is mechanically locked in place in the shingle as fabricated and as installed, and so the slit will not cause the shingle to bend in undesirable ways when being carried or installed. Second, while it is possible as described below to make slits that are very thin and thus difficult to see when the shingle is installed, a slit that is disposed under a tab will not be visible at all when the shingle is installed.

Figure 4:
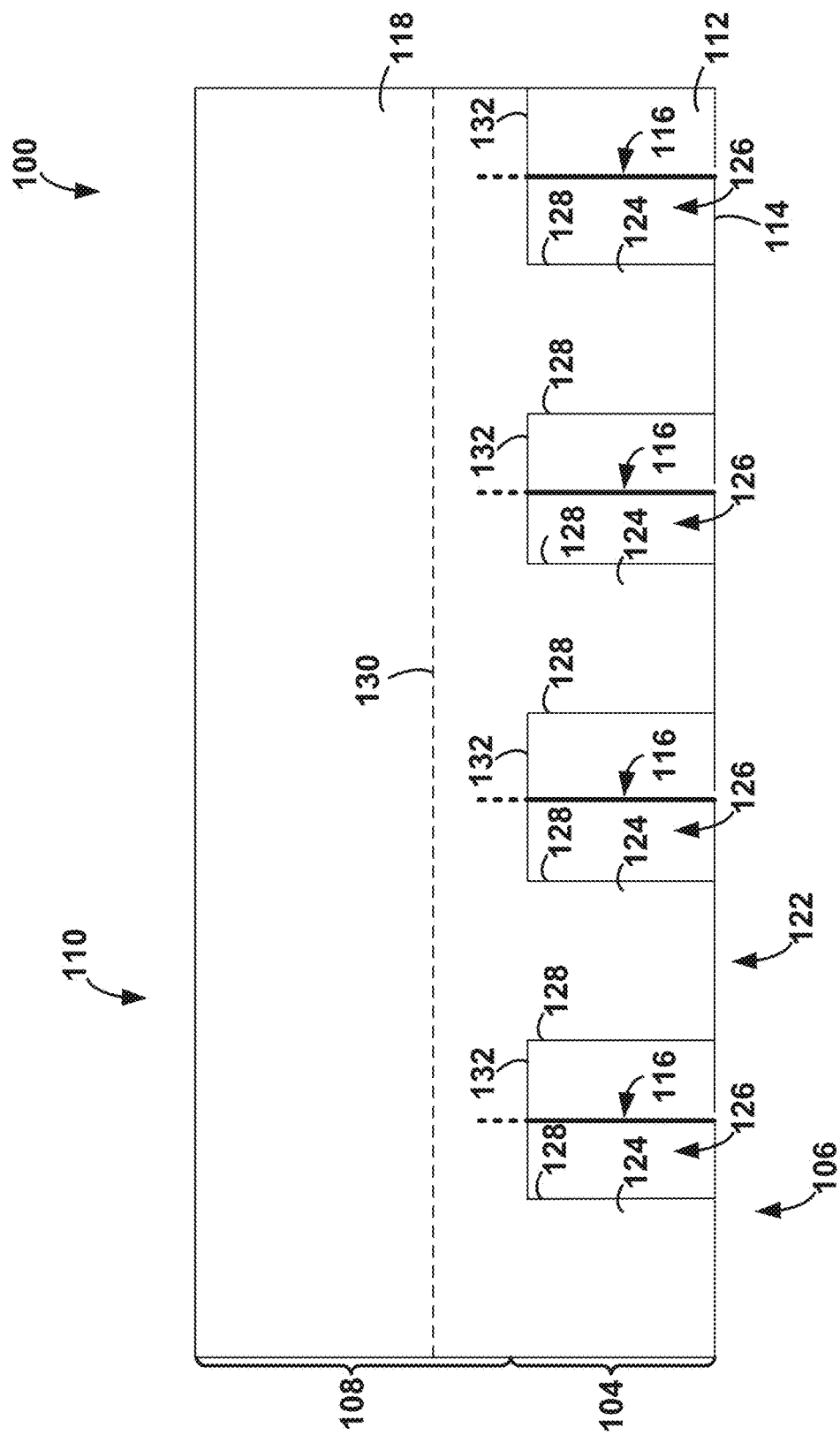
FIG. 4 is a schematic top view of a shingle according to another embodiment of the disclosure.

In certain embodiments as otherwise described herein, at least one of the one or more slits (e.g., each of the one or more slits) of the first bituminous sheet is not covered by the second bituminous sheet. FIG. 4 is a schematic top view of a shingle according to one such embodiment. As shown in FIG. 4, the one or more slits 116 may be uncovered by the second bituminous sheet 118. For example, in certain embodiments as otherwise described herein, at least one of (e.g., each of) the one or more slits is disposed substantially between the one or more tabs of the second bituminous sheet. For example, in the embodiment of FIG. 4, the one or more slits 116 are disposed substantially between the one or more tabs 124. For example, in certain embodiments as otherwise described herein at least one of the slits (e.g., each of the slits) is disposed at least 1 cm, at least 2 cm, or at least 3 cm from any lateral edge of a notch of the second bituminous sheet. While such slits are in an area of the shingle that is exposed, it is possible to make them sufficiently thin that they are not substantially visible from the ground when installed on a roof of a building.

Figure 5:
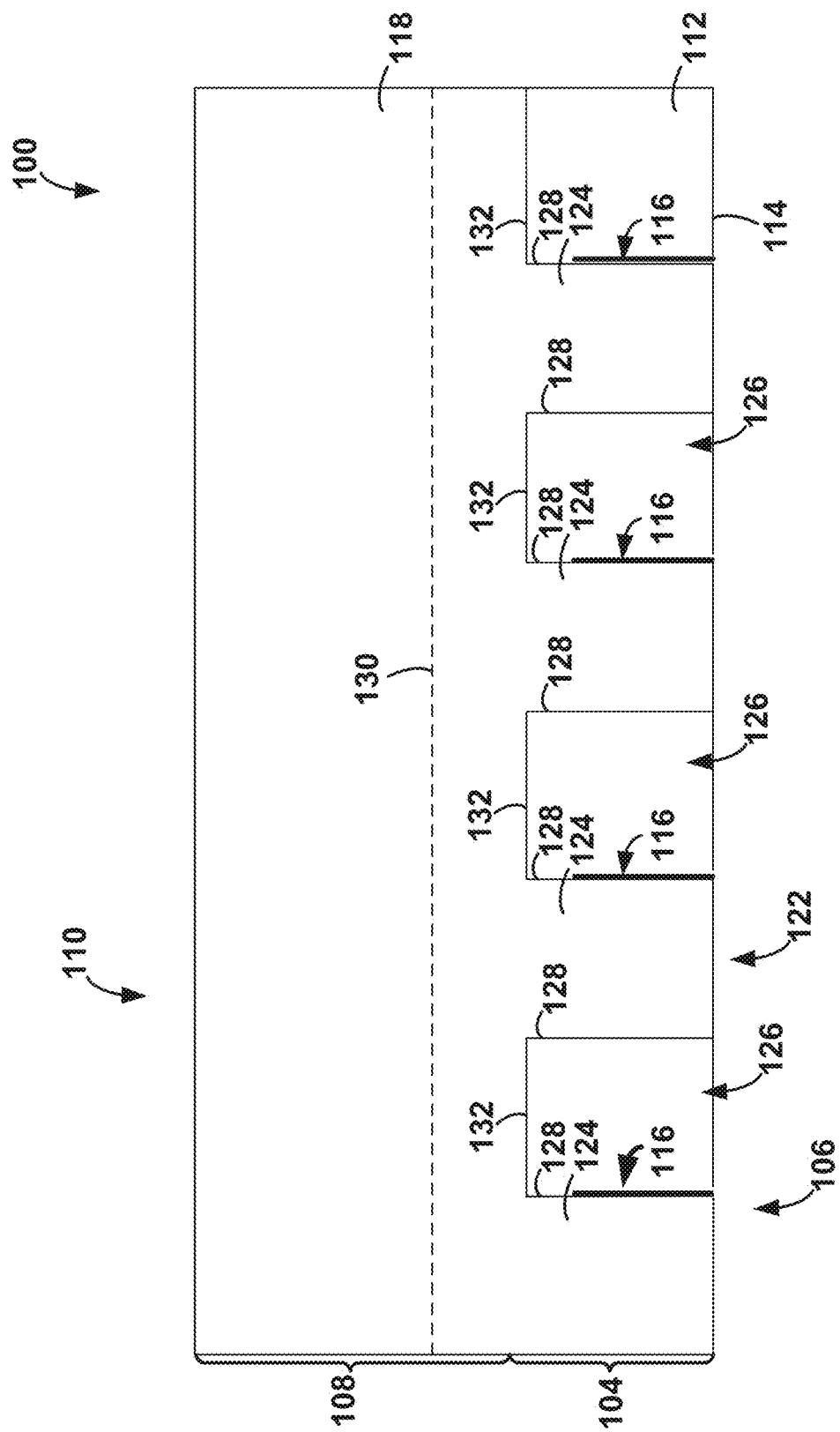
FIG. 5 is a schematic top view of a shingle according to another embodiment of the disclosure.

In certain embodiments as otherwise described herein, at least one of the slits (e.g., each of the slits) is disposed within 1 cm, or even within 5 mm of a lateral edge of a notch of the second bituminous sheet. Such embodiments can be advantageous in that the slit can appear as part of the border of the adjoining tab, and thus not substantially impact the aesthetics of the shingle. And in certain embodiments as otherwise described herein, at least one of the slits (e.g., each of the slits) is substantially aligned with the closest lateral edge of the second bituminous sheet. For example, in the embodiment of FIG. 5, the one or more slits 116 are uncovered by the second bituminous sheet 118 and substantially aligned with the closest lateral edge 128 of the second bituminous sheet 118. For example, an elongated border of a slit 116 may be substantially parallel with a lateral edge 128. In this embodiment, the tabs are rectangular, and so the slit is at a right angle to the horizontal. But in other embodiments, the tabs can have different shapes (e.g., a trapezoidal "dragon's tooth" shape, or any other desired shape); in such case, the slits can, for example, follow the line of the shape of the tab. And in the embodiment of FIG. 5, the one or more slits 116 are within 1 cm or within 5 mm of a lateral edge 128 of respective notches of the one or more notches 126. And the person of ordinary skill in the art will appreciate that the slits can be formed with any desired directionality, as long as they extend generally from the lower edge of the first bituminous sheet toward the upper edge of the shingle. Accordingly, they can be formed along a diagonal with respect to the lower edge of the shingle (i.e. not merely at right angles as shown in various Figures), and they need not follow any contour of the notches or tabs of the second bituminous sheet.

While each embodiment of FIGS. 1-8 is shown as having all of its slits in the same general configuration, the person of ordinary skill in the art will appreciate that slits can be provided in a combination of configurations in any given shingle. For example, in certain embodiments, a shingle can have slits disposed in any combination of under the tabs, substantially between the tabs, or adjacent the edges of the tabs.

Notably, one primary purpose of the slits is to provide strain relief to the first bituminous sheet. Accordingly, the slits need only be wide enough to physically separate sections of first bituminous sheet so that they can expand separately from one another. For example, in certain embodiments as otherwise described herein, at least one of (e.g., each of) the one or more slits has a width (e.g., parallel to the lower edge of the shingle) of no more than 1 cm. In certain such embodiments, at least one of (e.g., each of) the one or more slits has a width of no more 5 mm. In certain such embodiments, at least one of (e.g., each of) the one or more slits has a width of no more 3 mm (e.g., no more than 2 mm).

The one or more slits desirably extend substantially beyond the lower edge of the shingle. For example, in certain embodiments as otherwise described herein, at least one of (e.g., each of) the one or more slits 116 may extend at least 1 inch, at least 2 inches, or at least 3 inches from the lower edge 114 of the first bituminous sheet 112 toward an upper edge 130 of the first bituminous sheet 112. Additionally or alternatively, at least one of the one or more slits 116 may extend no more than 5.625 inches from the lower edge 114 of the first bituminous sheet 112 toward the upper edge 130 of the first bituminous sheet 112.

Figure 6:
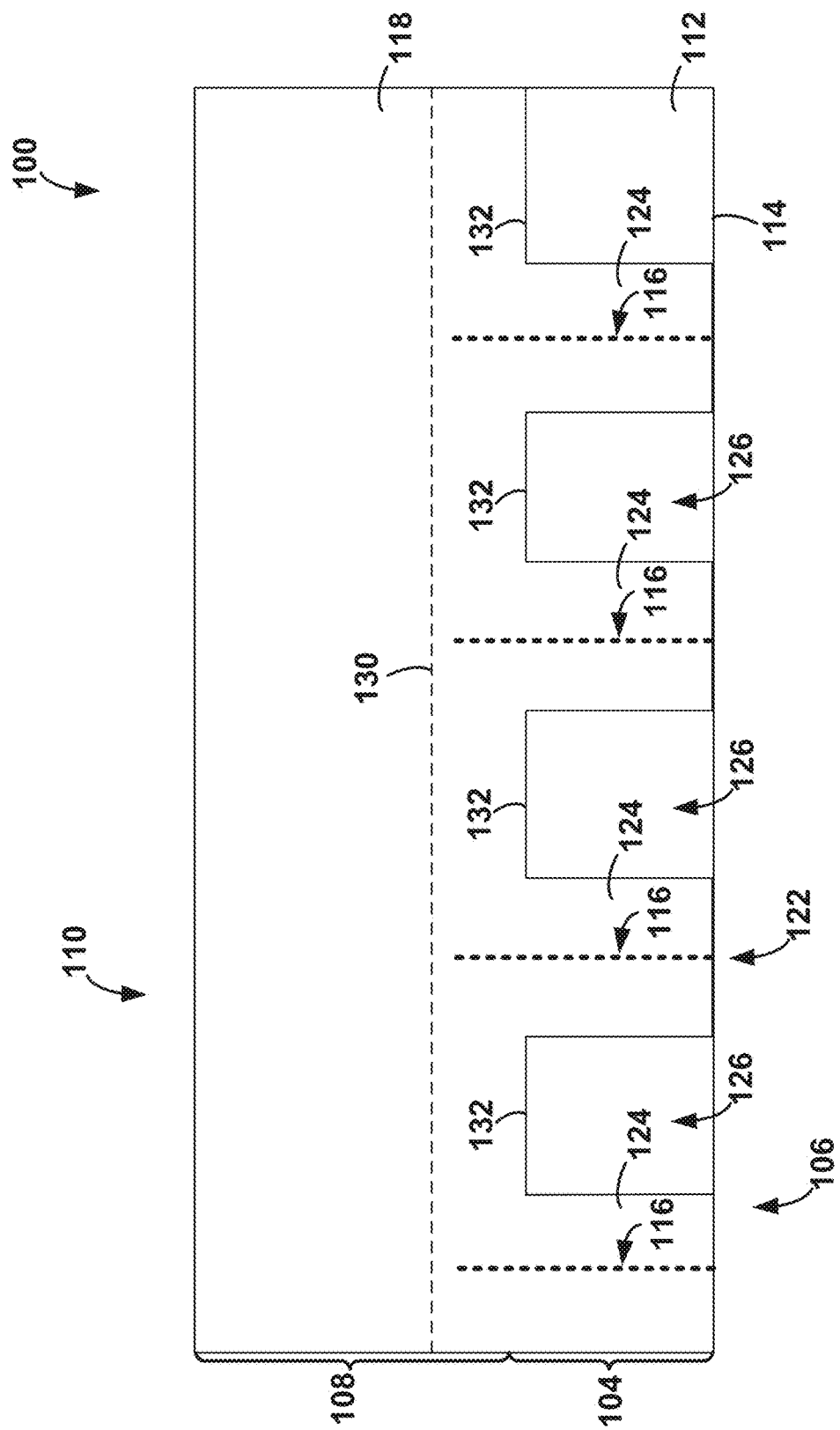
FIG. 6 is a schematic top view of a shingle according to another embodiment of the disclosure.
Figure 7:
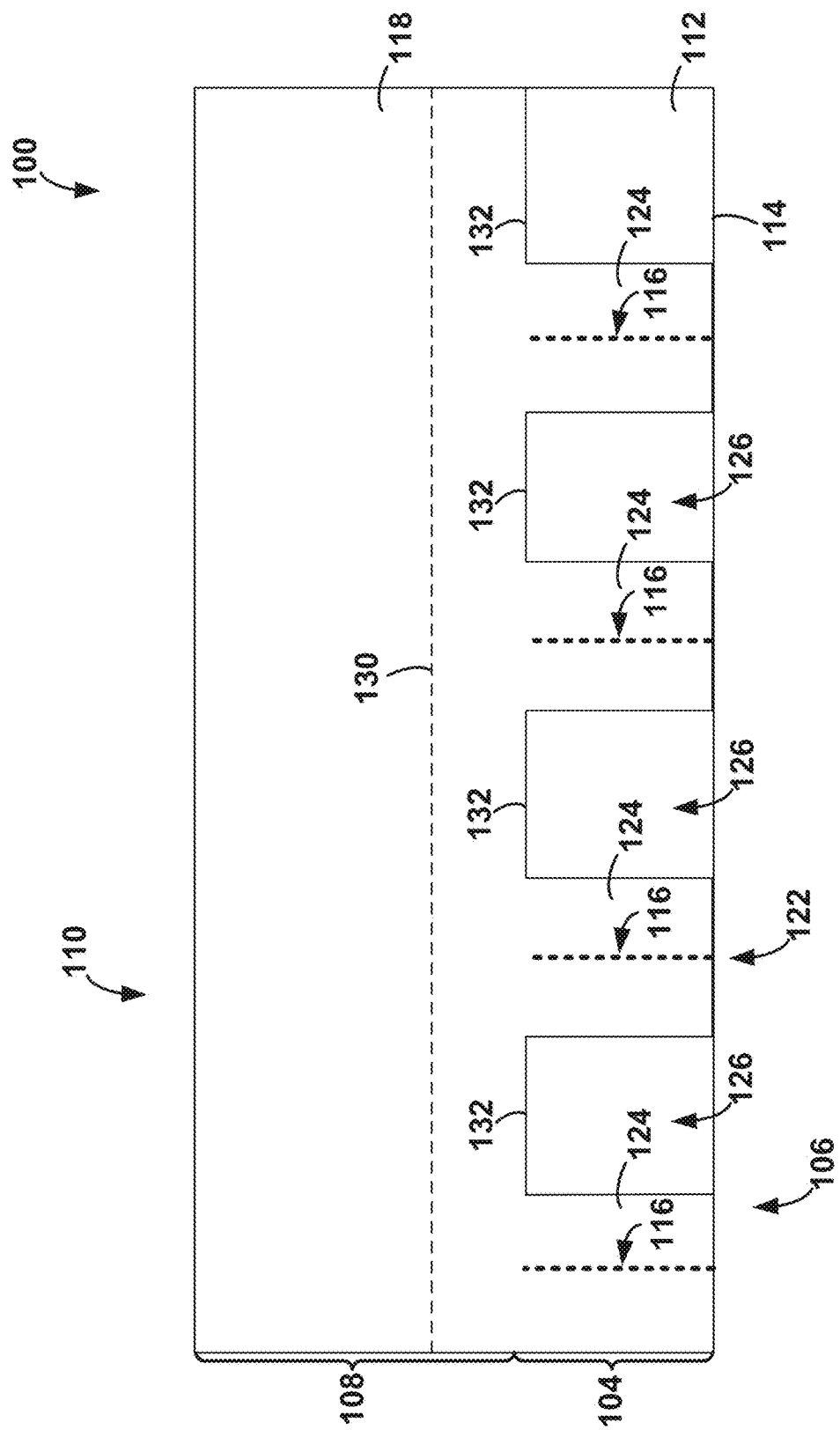
FIG. 7 is a schematic top view of a shingle according to another embodiment of the disclosure.

As shown in FIG. 6, at least one of (e.g., each of) the one or more slits 116 may extend throughout the exposure zone 104 toward the upper end 110 of the roofing shingle 100. As shown in FIG. 7, at least one of the one or more slits 116 extends toward the upper end 110 of the roofing shingle 100 at least as far as the closest notch 126 extends toward the upper end 110 of the roofing shingle. However, the one or more slits 116 might not extend fully through the exposure zone 104. In other examples, such as the one depicted in FIG. 3, at least one of (e.g., each of) the one or more slits 116 does not extend toward the upper end 110 of the roofing shingle 100 at least as far as the closest notch 126 extends toward the upper end 110 of the roofing shingle 100.

In various embodiments as otherwise described herein, at least one of (e.g., each of) the one or more slits 116 of the first bituminous sheet 112 extends toward the upper end 110 of the roofing shingle 100 in the range of 0.4 to 0.8 times the distance from the lower end 106 of the roofing shingle 100 to an upper edge 132 of the closest notch 126 of the second bituminous sheet 118 thereto.

In some embodiments as otherwise described herein, at least one of (e.g., each of) the one or more slits 116 extends no more than 8 inches, no more than 6 inches, no more than 5 inches, or no more than 4 inches from the lower edge 114 of the first bituminous sheet 112 toward the upper edge 110 of the first bituminous sheet 112.

Figure 8:
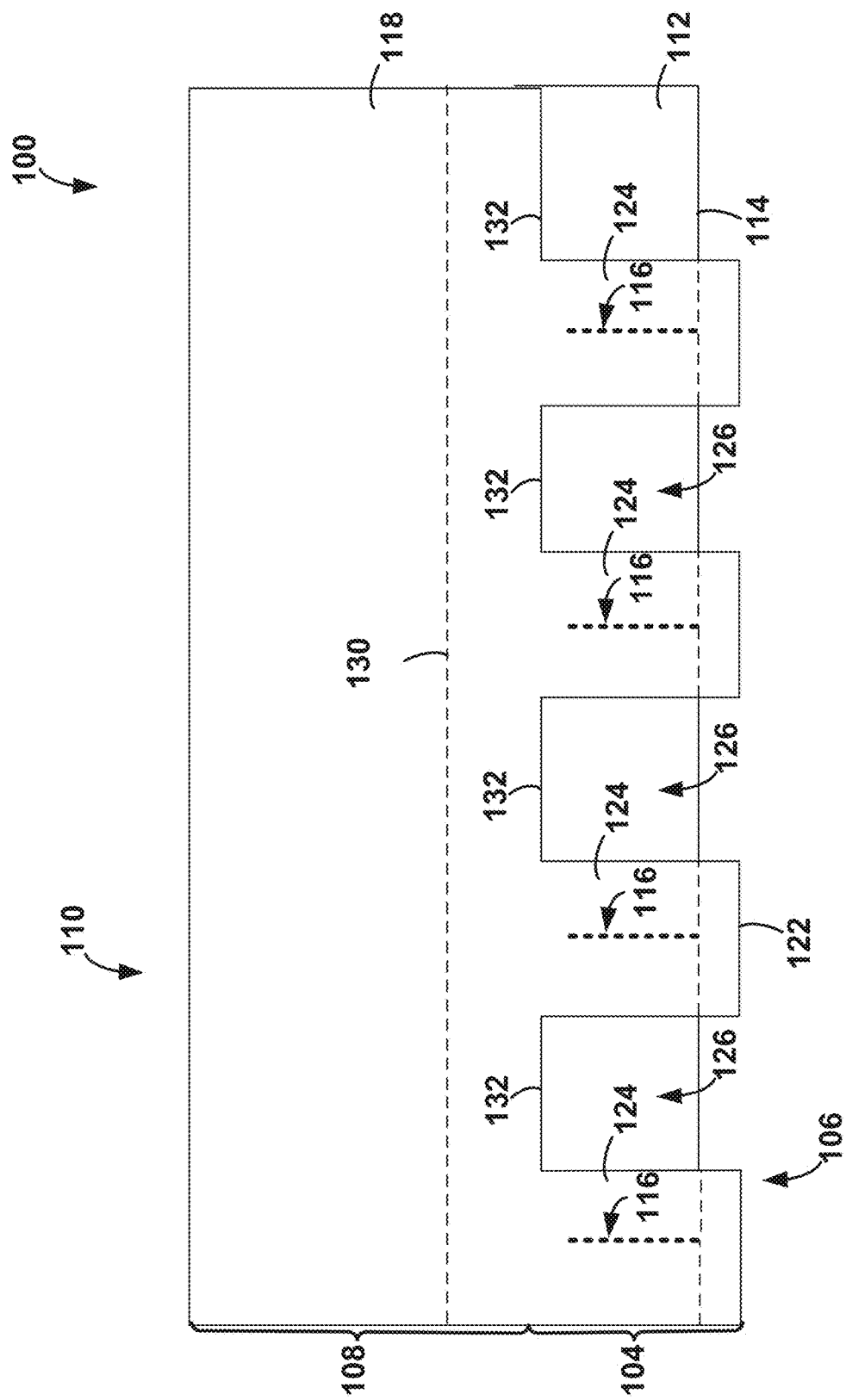
FIG. 8 is a schematic top view of a shingle according to another embodiment of the disclosure.

As shown in FIG. 8, the lower edge 122 of the second bituminous sheet 118 may extend beyond the lower edge 114 of the first bituminous sheet 112. That is, the one or more tabs 124 may extend beyond the lower edge 114. In certain such embodiments as otherwise described herein, the lower edge 122 of the second bituminous sheet 118 might extend beyond the lower edge 114 of the first bituminous sheet 112 by, for example, no more than 3 centimeters (cm), no more than 2 cm, or no more than 1 cm. In one particular embodiment, the lower edge 122 is disposed within about 1 centimeter of the lower edge 114.

In the embodiments of FIGS. 1-8, the first bituminous sheet 112 does not extend to the upper end 110 of the roofing shingle 100. This is a conventional construction for architectural shingles. However, the person of ordinary skill in the art will appreciate that other constructions are possible. For example, in other embodiments of the disclosure, the first bituminous sheet does extend substantially to the upper end of the roofing shingle. This, too, is a conventional construction for architectural shingles.

As described herein, the lower edge of each of the first bituminous sheet and the second bituminous sheet is disposed "at" the lower end of the shingle. The person of ordinary skill in the art will appreciate that neither the lower edge of the first bituminous sheet nor lower edge of the second bituminous sheet is necessarily disposed exactly coterminal with the lower end of the roofing shingle. Rather, in some cases the second bituminous sheet can extend farther than the first bituminous sheet, so that the lower edge of the first bituminous sheet is recessed somewhat from the lower edge of the shingle. And in other embodiments, lower edge of the second bituminous sheet does not extend all the way to the lower edge of the first bituminous sheet, so that the lower edge of the second bituminous sheet is recessed somewhat from the lower edge of the shingle. Nonetheless, in each case the lower edge of the sheet can be "at" the lower edge of the shingle because it is sufficiently near the lower edge of the shingle to be aesthetically considered as being at the lower edge. In embodiments as otherwise described herein, the lower edge of each sheet is within 2 cm of the lower edge of the shingle, e.g., within 1 cm, or within 5 mm.

For example, in the embodiments of FIGS. 1-8, the lower edge of the second bituminous sheet is shown as being substantially flush with the bottom edge of the first bituminous sheet, or overlapping the bottom edge of the first bituminous sheet. However, in other embodiments, the second bituminous sheet is somewhat recessed from the bottom edge of the first bituminous sheet, e.g., by in the range of about 1 mm to about 10 mm. Such a recession can provide the shingle with the appearance of greater depth and thickness.

In certain embodiments as otherwise described herein, at least one of the one or more notches 126 of the second bituminous sheet 118 has a width (e.g., parallel to the lower edge 114) of at least 2 inches and/or no more than 6 inches. In addition, in certain embodiments at least one of the one or more notches 126 of the second bituminous sheet 118 may extend from the lower edge 122 of the second bituminous sheet 118 toward the upper end 110 of the roofing shingle 100 by a distance of at least 2 inches and/or no more than 6 inches.

The roofing shingle 100 may, in certain embodiments as otherwise described herein, have an overall width (e.g., parallel to the lower edge 114) in the range of 24 inches to 48 inches, or in the range of 24 inches to 50 inches, for example, in the range of 30 inches to 42 inches. Also, in certain embodiments as otherwise described herein, the roofing shingle 100 may have a height (e.g., at a right angle to the width) in the range of 8 inches to 30 inches, e.g., in the range of 10 inches to 24 inches. In certain embodiments as otherwise described herein, the second bituminous sheet 118 has a height in the range of 8 inches to 30 inches (e.g., in the range of 10 inches to 24 inches), and the first bituminous sheet 112 has a height in the range of 4 inches to 20 inches or in the range of 6 inches to 12 inches.

The present inventors have noted that the problem of buckling to form tunnels is especially acute in shingles of lower weight, and that the use of slits as described herein can help to substantially reduce such buckling and tunneling in such shingles. Accordingly, in certain embodiments as otherwise described herein, a shingle has a weight of no more than 300 pounds per installed square (100 square feet of covered area) (i.e., "pounds per square"), for example, no more than 250 pounds per square, or no more than 225 pounds per square, or no more than 215 pounds per square, or no more than 210 pounds per square, or no more than 200 pounds per square, or no more than 180 pounds per square, or no more than 170 pounds per square. The person of ordinary skill in the art can use, for example, conventional methods and materials to provide low-weight shingles.

Prior to being disposed on a roof, the roofing shingle 100 may be packaged as a bundle of substantially similar roofing shingles.

Another embodiment of the disclosure is a roof that includes a roof deck having an upper end and a lower end, and a plurality of roofing shingles disposed thereon. The roofing shingles are disposed in a first course of a first plurality of the shingles and a second course of a second plurality of the shingles. The second course of shingles overlaps the headlap zones of the shingles of the first course of shingles. The headlap zones of the roofing shingles are disposed toward the upper end of the roof and the exposure zones of the roofing shingles are disposed toward the lower end of the roof.

Figure 9:
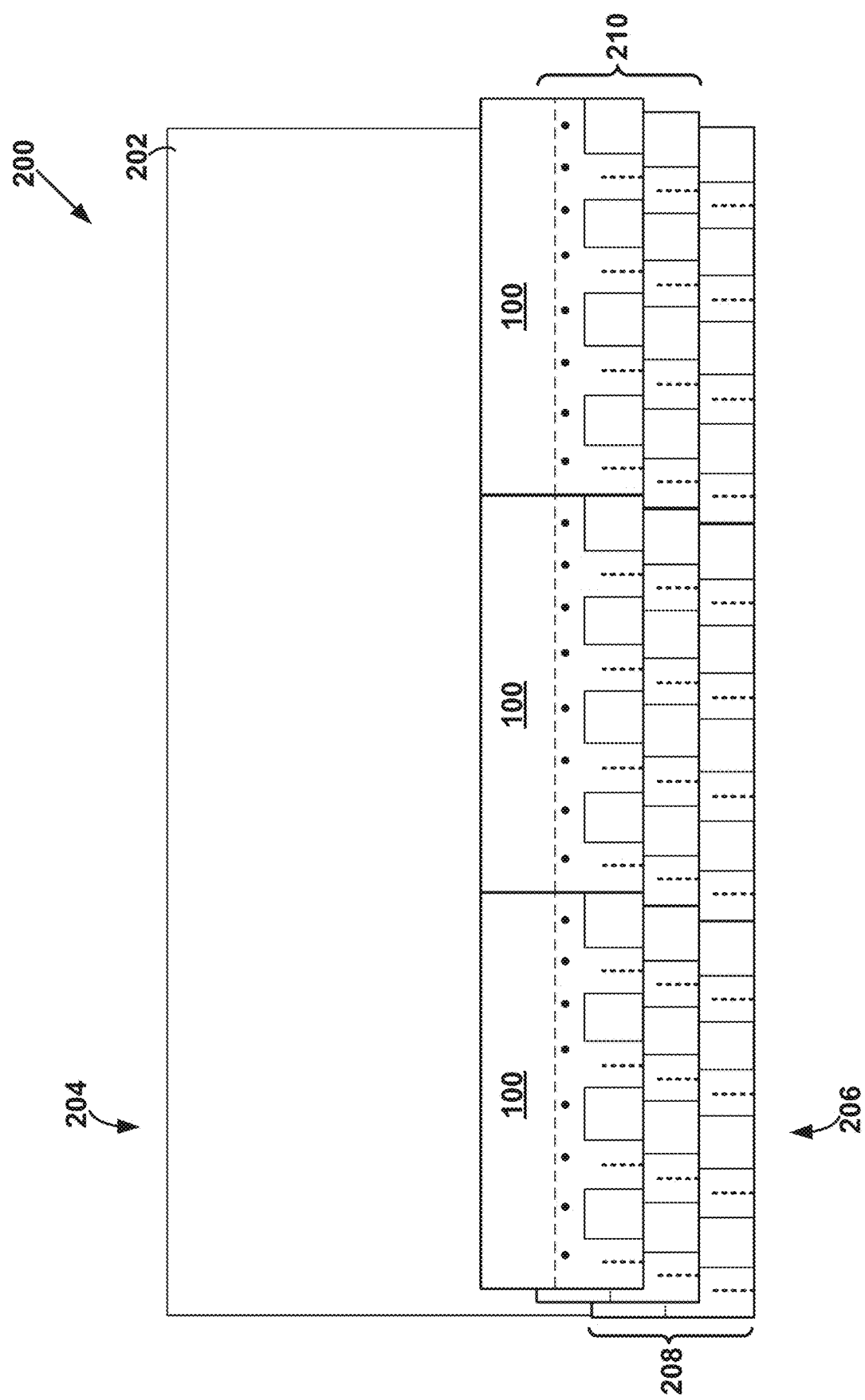
FIG. 9 is a schematic diagram of a partially installed roof.

Referring to FIG. 9 for example, the roof 200 includes a roof deck 202 having an upper end 204 and a lower end 206, and a plurality of roofing shingles 100 disposed thereon. The roofing shingles 100 are disposed in a first course 208 of a first plurality of the shingles 100 and a second course 210 of a second plurality of the shingles 100. The second course 210 of shingles 100 overlaps the headlap zones 108 (see, e.g., FIG. 3) of the shingles 100 of the first course 208 of shingles 100. The headlap zones 108 of the roofing shingles 100 are disposed toward the upper end 204 of the roof and the exposure zones 104 of the roofing shingles 100 are disposed toward the lower end 206 of the roof 200.

Figure 10:
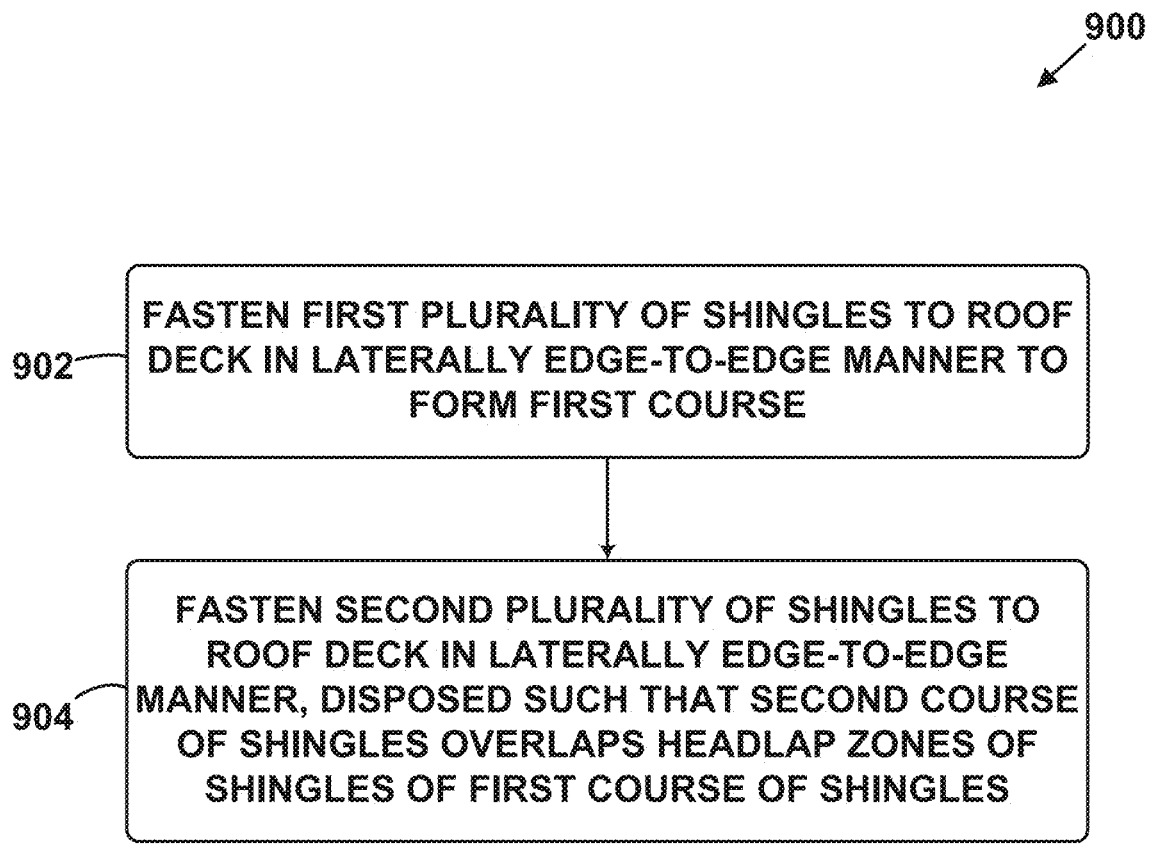
FIG. 10 is a block diagram of a method for installing shingles to a roof deck according to another embodiment of the disclosure.

FIG. 10 is a block diagram of a method 900 for installing shingles such as the shingles 100 to a roof deck such as the roof deck 202.

Figure 11:
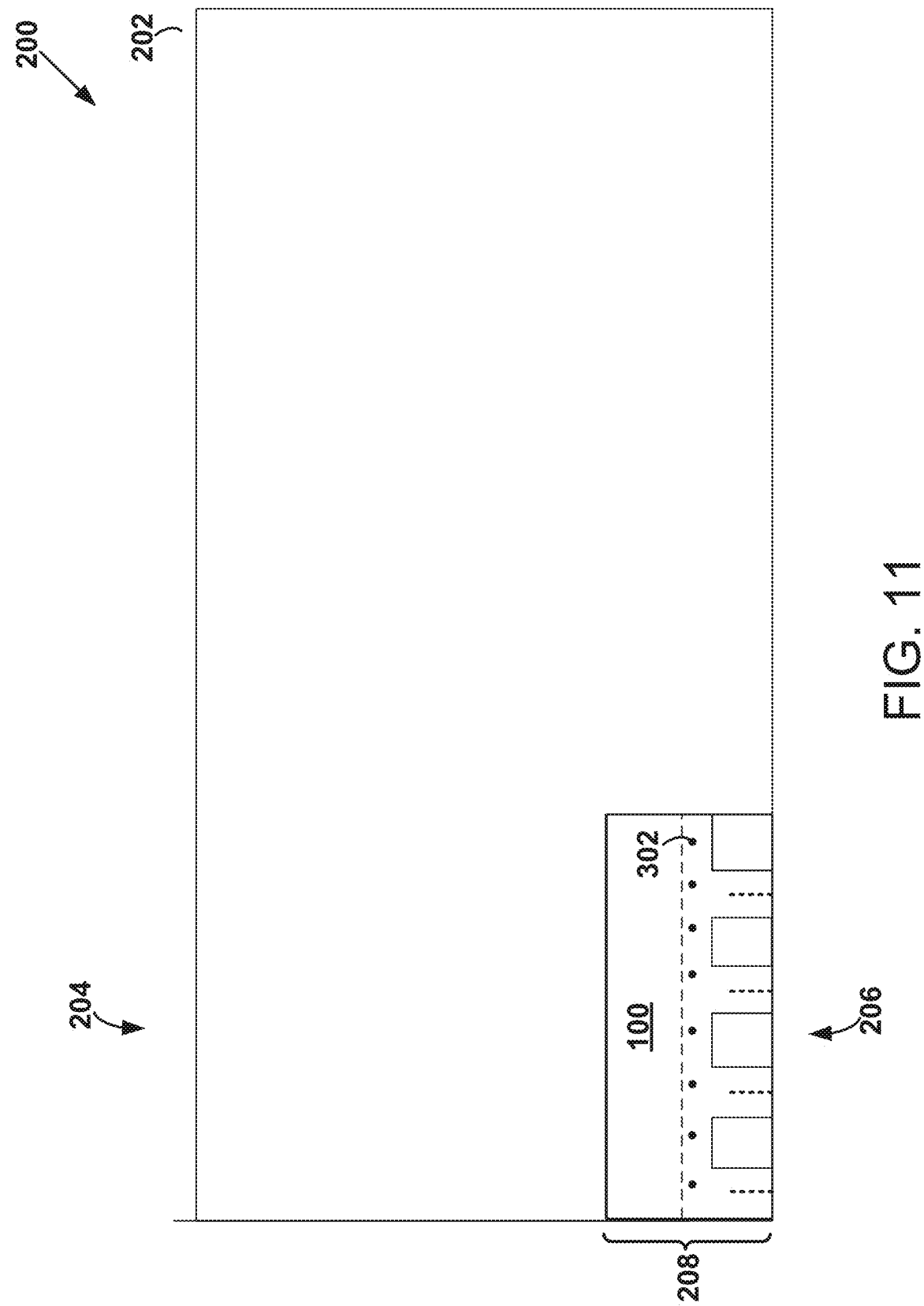
FIG. 11 is a schematic diagram of installation of a shingle to a roof deck according to another embodiment of the disclosure.
Figure 12:
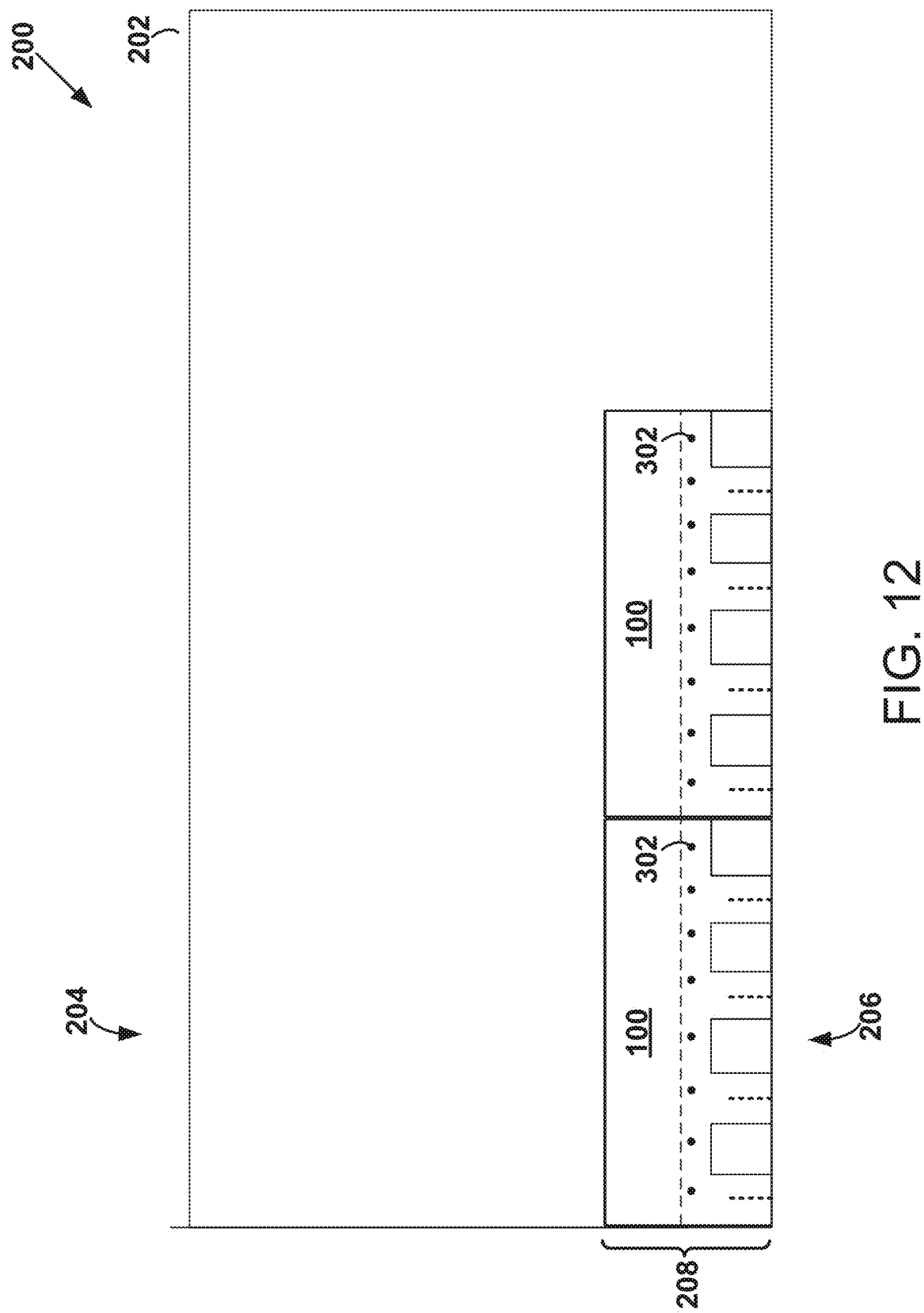
FIG. 12 is a schematic diagram of installation of shingles to a roof deck according to another embodiment of the disclosure.
Figure 13:
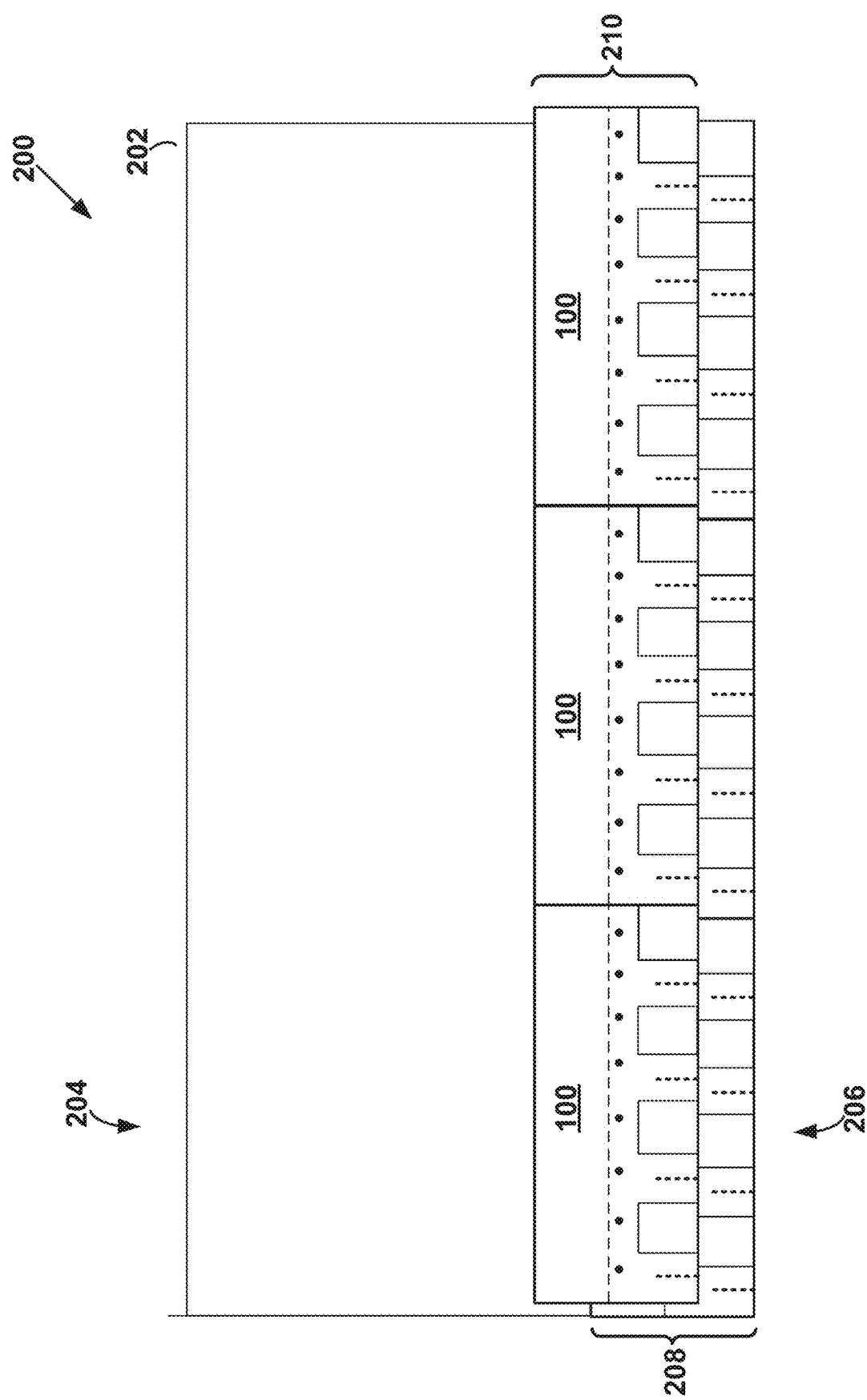
FIG. 13 is a schematic diagram of installation of shingles to a roof deck according to another embodiment of the disclosure.

At block 902, the method 900 includes fastening the first plurality of the shingles to the roof deck in a laterally edge-to-edge manner to form a first course. For example, an installer may fasten the first plurality of shingles to the roof deck 202 in a laterally edge-to-edge manner to form a first course 208 as shown in FIGS. 9 and 11-13. FIG. 9 shows multiple courses or rows of shingles 100 installed to the roof deck 202. FIGS. 11-13 show some steps of the installation process.

More specifically, FIG. 11 shows a first shingle 100 installed to the roof deck 202 at a lower left corner of the roof deck 202. In one example, fasteners 302 such as nails are forced through the shingles 100 and the roof deck 202 to secure the shingles 100 to the roof deck 202. The fasteners 302 may be driven through the respective first bituminous sheets 112 and the respective second bituminous sheets 118, and into the roof deck 202, for example.

FIG. 12 shows an additional shingle of the first course 208 after being installed.

At block 904, the method 900 includes fastening the second plurality of the shingles to the roof deck in a laterally edge-to-edge manner, disposed such that the second course of shingles overlaps the headlap zones of the shingles of the first course of shingles. For example, an installer may fasten the second plurality of shingles to the roof deck 202 in a laterally edge-to-edge manner to form a second course 210 of shingles 100 that overlaps the headlap zones 108 of the shingles 100 of the first course 208, as shown in FIGS. 9 and 13.

The fasteners 302 may be placed through the respective first bituminous sheets 112 and the respective second bituminous sheets 118 at a position that is between the one or more tabs 124 of the second bituminous sheets 118 and the upper edge 130 of the first bituminous sheets 112.

Figure 14:
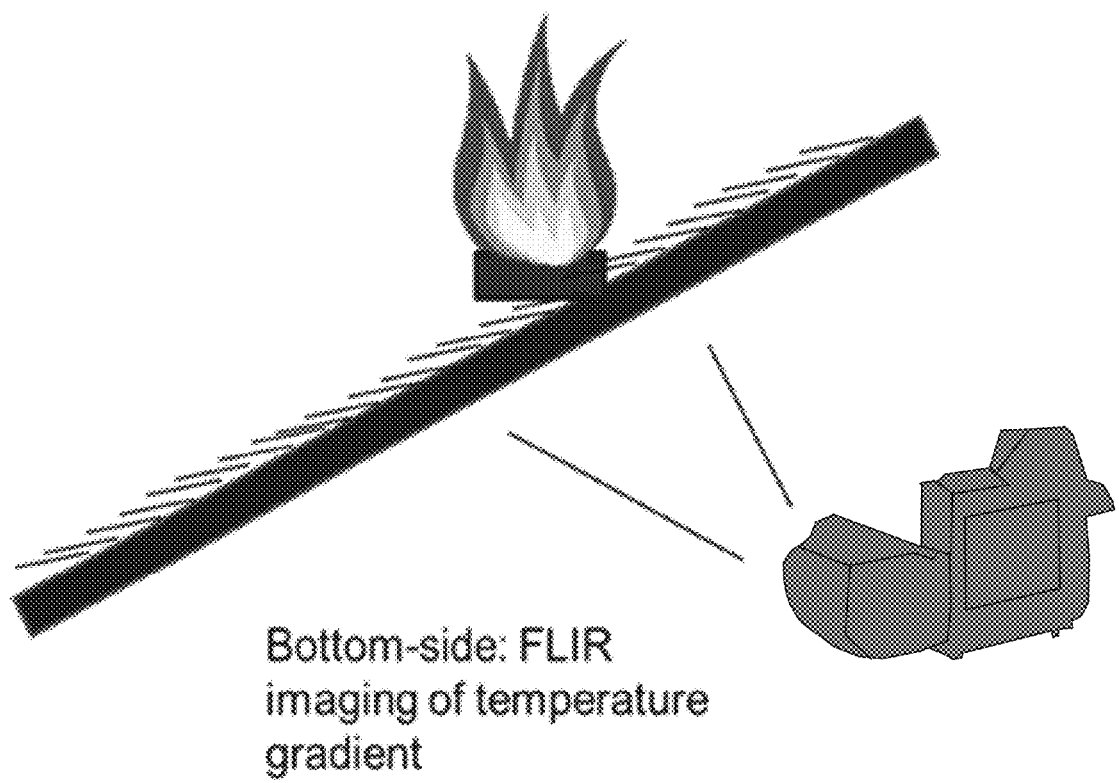
FIG. 14 is a schematic diagram of a procedure for testing the fire resistance of shingles.

FIG. 14 is a schematic diagram of a procedure for testing the fire resistance of shingles such as the shingle 100. In experiments described below, various shingles were subjected to ASTM (American Society for Testing Materials) E108 fire resistance tests. The test involves igniting a wood "brand" such as a pallet as it sits atop a shingled roof. As shown in FIG. 14, an infrared camera (e.g., forward-looking infrared or "FLIR") was also placed below the roof to monitor temperature.

The table below provides results of the aforementioned fire-resistance tests performed on various architectural shingles, in three sets of experiments (each performed on the same shingle type, each a conventional "dragon's tooth" type shingle). "No slit" experimental samples were used as received; "strain relief slit" samples had slits cut using a knife through the bottom layer in each notch adjacent a dragon's tooth, through the entire height of the notch. The "time" of the experiment was either the time at failure (i.e. the point at which the roof deck catches fire), or, for passing samples, the time at which the temperature of the roof had decreased to a safe level.

|  | no slit |  | strain relief slit |  |
|---|---|---|---|---|
| 1A | Fail | 0:47:54 |  |  |
| 1B | pass | 0:47:05 |  |  |
| 1C | pass | 0:51:02 |  |  |
| 1D | pass | 0:40:50 |  |  |
| 1E |  |  | pass | 0:45:00 |
| av. pass time |  | 0:46:19 |  | 0:45:00 |
| # passing tests |  | n = 3 |  | n = 1 |
| 2A | pass | 0:47:00 |  |  |
| 2B | pass | 0:57:00 |  |  |
| 2C |  |  | pass | 0:39:00 |
| av. pass time |  | 0:52:00 |  | 0:39:00 |
| # passing tests |  | n = 2 |  | n = 1 |
| 3A | pass | 1:30:00 |  |  |
| 3B | fail | 0:35:58 |  |  |
| 3C | pass | 1:30:00 |  |  |
| 3D |  |  |  |  |
| 3E |  |  | pass | 0:38:03 |
| 3F |  |  | pass | 0:35:51 |
| av. pass time |  | 1:30:00 |  | 0:36:57 |
| # passing tests |  | n = 2 |  | n = 2 |

Figure 15:
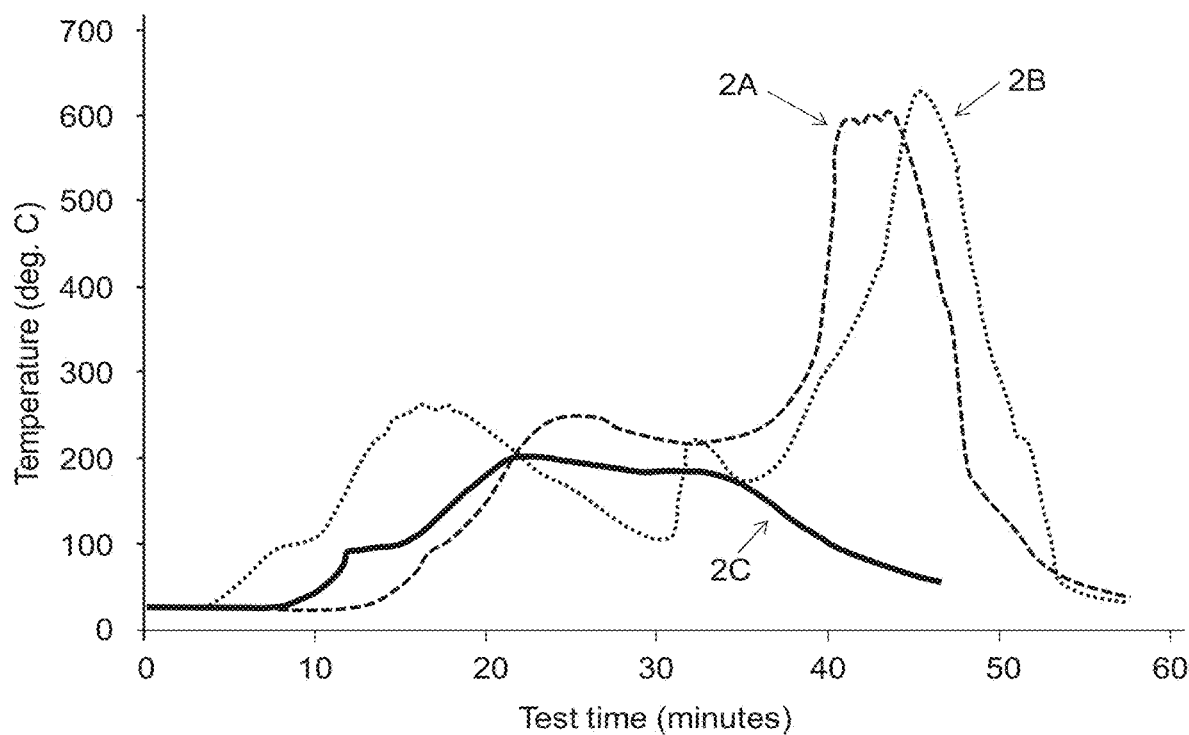
FIG. 15 is a graph representing roof temperature versus time when various shingles were subjected to ASTM E108 test procedures.

FIG. 15 is a graph representing the highest roof temperature versus time when various shingles were subjected to ASTM E108 test procedures. Whereas the control samples (2A and 2B) developed strong hotspots that could have ignited the wood deck and barely passed the test, the shingle with slits (2C) exhibited much lower hotspot temperature, if a hotspot formed at all, and the test ended much earlier.

Accordingly, the data indicate that the use of shingles with slits formed in the bottom bituminous sheet thereof appear to significantly reduce hotspot formation and intensity as well as test time.

Another aspect of the disclosure is a method for making a shingle as described herein. In one such method, the one or more slits in the first bituminous sheet are formed before the shingle is assembled. For example, in one embodiment, a method for making a roofing shingle as described herein includes providing a first bituminous sheet having a lower edge disposed at the lower end of the roofing shingle, the first bituminous sheet having one or more slits formed therein, each of the one or more slits extending from the lower edge of the first bituminous sheet toward the upper end of the first bituminous sheet; and a second bituminous sheet having a lower edge, the second bituminous sheet having one or more tabs formed in an exposure zone, the one or more tabs being defined by one or more notches formed in the second bituminous sheet, each notch extending away from the lower edge of the second bituminous sheet; and at least partially laminating the second bituminous sheet to a top surface of the first bituminous sheet to form the roofing shingle.

In other such methods, the one or more slits in the first bituminous sheet are formed after the shingle is assembled. Thus, another embodiment of the disclosure is a method for making a roofing shingle as described herein. The method includes: providing a roofing shingle having a bottom surface, the roofing shingle having an exposure zone at a lower end thereof and a headlap zone at an upper end thereof, the roofing shingle including a first bituminous sheet disposed at the bottom surface of the shingle in the exposure zone thereof, the first bituminous sheet having a lower edge disposed at the lower end of the roofing shingle; and a second bituminous sheet at least partially laminated to a top surface of the first bituminous sheet, the second bituminous sheet having a lower edge disposed at the lower end of the roofing shingle, the second bituminous sheet having one or more tabs formed in the exposure zone of the shingle, the one or more tabs being defined by one or more notches formed in the second bituminous sheet, each notch extending away from the lower edge of the second bituminous sheet; and forming one or more slits in the first bituminous sheet, each of the one or more slits extending from the lower edge of the first bituminous sheet toward the upper end of the roofing shingle.

Conventional methodologies for shingle construction can be used in the fabrication of shingles as described herein.

Shingles of the disclosure are further described by the following non-limiting enumerated embodiments, which can be combined in any logical and technically consistent fashion:

Embodiment 1

A roofing shingle having a bottom surface, the roofing shingle having an exposure zone at a lower end thereof and a headlap zone at an upper end thereof, the roofing shingle comprising:
- a first bituminous sheet disposed at the bottom surface of the shingle in the exposure zone thereof, the first bituminous sheet having a lower edge disposed at the lower end of the roofing shingle, the first bituminous sheet having one or more slits formed therein, each of the one or more slits extending from the lower edge of the first bituminous sheet toward the upper end of the roofing shingle; and
- a second bituminous sheet at least partially laminated to a top surface of the first bituminous sheet, the second bituminous sheet having a lower edge disposed at the lower end of the roofing shingle, the second bituminous sheet having one or more tabs formed in the exposure zone of the shingle, the one or more tabs being defined by one or more notches formed in the second bituminous sheet, each notch extending away from the lower edge of the second bituminous sheet.

Embodiment 2

The roofing shingle of embodiment 1, wherein at least one of the one or more slits of the first bituminous sheet is covered by the second bituminous sheet.

Embodiment 3

The roofing shingle of embodiment 2, wherein one or more of the at least one slits covered by the second bituminous sheet is covered by a respective tab of the one or more tabs of the second bituminous sheet.

Embodiment 4

The roofing shingle of any of embodiments 1-3, wherein one or more of the slits of the first bituminous sheet is not covered by the second bituminous sheet.

Embodiment 5

The roofing shingle of embodiment 4, wherein at least one of the one or more slits is disposed substantially between one or more tabs of the second bituminous sheet.

Embodiment 6

The roofing shingle of any of embodiments 1-5, wherein at least one of the one or more slits not covered by the second bituminous sheet is disposed at least 1 cm, e.g., at least 2 cm or at least 3 cm, from any lateral edge of a notch of the second bituminous sheet.

Embodiment 7

The roofing shingle of any of embodiments 1-6, wherein at least one of the one or more slits not covered by the second bituminous sheet is within 1 centimeter (e.g., within 5 millimeters) of a lateral edge of a notch of the second bituminous sheet.

Embodiment 8

The roof shingle of any of embodiments 1-7, wherein each of the at least one slits not covered by the second bituminous sheet is substantially aligned with the closest lateral edge of the second bituminous sheet.

Embodiment 9

The roofing shingle of any of embodiments 1-7, wherein at least one of (e.g., each of) the one or more slits of the first bituminous sheet has a width of no more than 1 cm.

Embodiment 10

The roofing shingle of any of embodiments 1-7, wherein at least one of (e.g., each of) the one or more slits of the first bituminous sheet has a width of no more than 5 mm.

Embodiment 11

The roofing shingle of any of embodiments 1-7, wherein at least one of (e.g., each of) the one or more slits of the first bituminous sheet has a width of no more than 3 mm.

Embodiment 12

The roofing shingle of any of embodiments 1-11, wherein at least one of (e.g., each of) the one or more slits of the first bituminous sheet extends at least 1 inch, at least 2 inches, or at least 3 inches from the lower edge of the first bituminous sheet toward an upper edge of the first bituminous sheet.

Embodiment 13

The roofing shingle of any of embodiments 1-12, wherein at least one of (e.g., each of) the one or more slits of the first bituminous sheet extends no more than 5.625 inches from the lower edge of the first bituminous sheet toward the upper edge of the first bituminous sheet.

Embodiment 14

The roofing shingle of any of embodiments 1-13, wherein at least one of (e.g., each of) the one or more slits of the first bituminous sheet extends throughout the exposure zone toward the upper end of the roofing shingle.

Embodiment 15

The roofing shingle of any of embodiments 1-14, wherein at least one of (e.g., each of) the one or more slits of the first bituminous sheet extends toward the upper end of the roofing shingle at least as far as the closest notch of the second bituminous sheet thereto extends toward the upper end of the roofing shingle.

Embodiment 16

The roofing shingle of any of embodiments 1-15, wherein at least one of (e.g., each of) the one or more slits of the first bituminous sheet does not extend toward the upper end of the roofing shingle at least as far as the closest notch of the second bituminous sheet thereto extends toward the upper end of the roofing shingle.

Embodiment 17

The roofing shingle of any of embodiments 1-16, wherein at least one of (e.g., each of) the one or more slits of the first bituminous sheet extends toward the upper end of the roofing shingle in the range of 0.4 to 0.8 times the distance from the lower end of the shingle to an upper edge of the closest notch of the second bituminous sheet thereto.

Embodiment 18

The roofing shingle of any of embodiments 1-17, wherein at least one of (e.g., each of) the one or more slits of the first bituminous sheet extends no more than 8 inches, no more than 6 inches, no more than 5 inches, or no more than 4 inches from the lower edge of the first bituminous sheet toward the upper edge of the first bituminous sheet.

Embodiment 19

The roofing shingle of any of embodiments 1-18, wherein the lower edge of the second bituminous sheet extends beyond the lower edge of the first bituminous sheet.

Embodiment 20

The roofing shingle of embodiment 19, wherein the lower edge of the second bituminous sheet extends beyond the lower edge of the first bituminous sheet by no more than 3 cm (e.g., no more than 2 cm, or no more than 1 cm).

Embodiment 21

The roofing shingle of any of embodiments 1-18, wherein the lower edge of the second bituminous sheet is disposed within about 1 centimeter of the lower edge of the first bituminous sheet.

Embodiment 22

The roofing shingle of any of embodiments 1-21, wherein the first bituminous sheet does not extend to the upper end of the roofing shingle.

Embodiment 23

The roofing shingle of any of embodiments 1-22, wherein the first bituminous sheet comprises at least 2 slits.

Embodiment 24

The roofing shingle of any of embodiments 1-23, wherein the first bituminous sheet comprises no more than 6 slits.

Embodiment 25

The roofing shingle of any of embodiments 1-24, wherein the second bituminous sheet comprises at least 1 notch.

Embodiment 26

The roofing shingle of any of embodiments 1-24, wherein the second bituminous sheet comprises no more than 6 notches.

Embodiment 27

The roofing shingle of any of embodiments 1-26, wherein at least one of the one or more notches of the second bituminous sheet has a width of at least 5 centimeters.

Embodiment 28

The roofing shingle of any of embodiments 1-27, wherein at least one of the one or more notches of the second bituminous sheet has a width of no more than 25 centimeters.

Embodiment 29

The roofing shingle of any of embodiments 1-28, wherein at least one of the one or more notches of the second bituminous sheet extends from the lower edge of the second bituminous sheet toward the upper end of the roofing shingle by a distance of at least 5 centimeters.

Embodiment 30

The roofing shingle of embodiment 29, wherein at least one of the one or more notches of the second bituminous sheet extends from the lower edge of the second bituminous sheet toward the upper end of the roofing shingle by a distance that is no more than 25 centimeters.

Embodiment 31

The roofing shingle of any of embodiments 1-30, wherein the one or more slits of the first bituminous sheet are substantially different from the notches of the second bituminous sheet.

Embodiment 32

The roofing shingle of any of embodiments 1-31, wherein the lower edge of the second bituminous sheet extends beyond the lower edge of the first bituminous sheet, so that the lower edge of the first bituminous sheet is recessed somewhat from the lower edge of the shingle.

Embodiment 33

The roofing shingle of any of embodiments 1-31, wherein the lower edge of the second bituminous sheet does not extend all the way to the lower edge of the first bituminous sheet, so that the lower edge of the second bituminous sheet is recessed somewhat from the lower edge of the shingle.

Embodiment 34

The roofing shingle of any of embodiments 1—In certain such embodiments, the lower edge of each of the first bituminous sheet and the second bituminous sheet is within 2 cm of the lower edge of the shingle, e.g., within 1 cm, or within 5 mm.

Embodiment 35

The roofing shingle of any of embodiments 1-34, wherein the first bituminous sheet and/or the second bituminous sheet comprise a bitumen-coated mat.

Embodiment 36

The roofing shingle of embodiment 35, wherein the mat is fiberglass mat or felt mat.

Embodiment 37

The roofing shingle of any of embodiments 1-36, wherein the first bituminous sheet and/or the second bituminous sheet is coated with roofing granules.

Embodiment 38

The roofing shingle of any of embodiments 1-37, wherein the roofing shingle has a width in the range of 24 inches to 50 inches, e.g., in the range of 30 inches to 42 inches.

Embodiment 39

The roofing shingle of any of embodiments 1-38, wherein the roofing shingle has a height in the range of 8 inches to 30 inches, e.g., in the range of 10 inches to 24 inches.

Embodiment 40

The roofing shingle of any of embodiments 1-39, wherein the second bituminous sheet has a height in the range of 8 inches to 30 inches (e.g., in the range of 10 inches to 24 inches), and the first bituminous sheet has a height in the range of 4 inches to 20 inches (e.g., in the range of 6 inches to 12 inches).

Embodiment 41

The roofing shingle of any of embodiments 1-41, wherein the shingle has a weight of no more than 250 pounds per square.

Embodiment 42

The roofing shingle of any of embodiments 1-41, wherein the roofing shingle is not disposed on a roof.

Embodiment 43

A bundle of a plurality of shingles of embodiment 42.

Embodiment 44

A roof comprising a roof deck having an upper end and a lower end, and a plurality of roofing shingles of any of embodiments 1-41 disposed thereon, the roofing shingles being disposed in a first course of a first plurality of the shingles and a second course of a second plurality of the shingles, the second course of shingles overlapping the headlap zones of the shingles of the first course of shingles, the headlap zones of the roofing shingles being disposed toward the upper end of the roof and the exposure zones of the roofing shingles being disposed toward the lower end of the roof.

Embodiment 45

A method for installing a roof according to embodiment 44, the method comprising:
    fastening the first plurality of the shingles to the roof deck in a laterally edge-to-edge manner to form a first course, and
    fastening the second plurality of the shingles to the roof deck in a laterally edge-to-edge manner, disposed such that the second course of shingles overlaps the headlap zones of the shingles of the first course of shingles.

Embodiment 46

The method of embodiment 45, wherein fastening each roof shingle to the roof comprises placing a fastener through the first bituminous sheet and the second bituminous sheet, and into the roof deck.

Embodiment 47

The method of embodiment 46, wherein placing the fastener comprises placing the fastener through the sheets at a position that is between the one or more tabs of the second bituminous sheet and the upper edge of the first bituminous sheet.

Embodiment 48

A method for making a shingle according to any of embodiments 1-41, the method comprising:
    providing
        a first bituminous sheet having a lower edge disposed at the lower end of the roofing shingle, the first bituminous sheet having one or more slits formed therein, each of the one or more slits extending from the lower edge of the first bituminous sheet toward the upper end of the first bituminous sheet; and a second bituminous sheet having a lower edge, the second bituminous sheet having one or more tabs formed in an exposure zone, the one or more tabs being defined by one or more notches formed in the second bituminous sheet, each notch extending away from the lower edge of the second bituminous sheet; and at least partially laminating the second bituminous sheet to a top surface of the first bituminous sheet to form the roofing shingle.

Embodiment 49

A method for making a shingle according to any of embodiments 1-41, the method comprising:

providing a roofing shingle having a bottom surface, the roofing shingle having an exposure zone at a lower end thereof and a headlap zone at an upper end thereof, the roofing shingle comprising a first bituminous sheet disposed at the bottom surface of the shingle in the exposure zone thereof, the first bituminous sheet having a lower edge disposed at the lower end of the roofing shingle; and a second bituminous sheet at least partially laminated to a top surface of the first bituminous sheet, the second bituminous sheet having a lower edge disposed at the lower end of the roofing shingle, the second bituminous sheet having one or more tabs formed in the exposure zone of the shingle, the one or more tabs being defined by one or more notches formed in the second bituminous sheet, each notch extending away from the lower edge of the second bituminous sheet; and forming one or more slits in the first bituminous sheet, each of the one or more slits extending from the lower edge of the first bituminous sheet toward the upper end of the roofing shingle.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A roofing shingle having a top surface and a bottom surface, the roofing shingle having an exposure zone at a lower end of the top surface thereof and a headlap zone at an upper end thereof, the roofing shingle comprising:

a first bituminous sheet providing the bottom surface of the shingle in the exposure zone thereof, the first bituminous sheet having a top surface and a bottom surface, the first bituminous sheet having a lower edge disposed at the lower end of the roofing shingle, the first bituminous sheet having one or more slits formed therein, each of the one or more slits extending from the lower edge of the first bituminous sheet toward the upper end of the roofing shingle; and a second bituminous sheet having a top surface and a bottom surface, the bottom surface of the second bituminous sheet being at least partially laminated to the top surface of the first bituminous sheet, the second bituminous sheet having a lower edge disposed at the lower end of the roofing shingle, the second bituminous sheet having one or more tabs formed in the exposure zone of the shingle, the one or more tabs being defined by one or more notches formed in the second bituminous sheet, each notch extending away from the lower edge of the second bituminous sheet, wherein at least one of one or more of the slits of the first bituminous sheet is not covered by the second bituminous sheet and has a width of no more than 3 mm.

2. The roofing shingle of claim 1, wherein at least one of the one or more slits of the first bituminous sheet is covered by the second bituminous sheet.

3. The roofing shingle of claim 2, wherein one or more of the at least one slits covered by the second bituminous sheet is covered by a respective tab of the one or more tabs of the second bituminous sheet.

4. The roofing shingle of claim 1, wherein at least one of one or more of the slits of the first bituminous sheet not covered by the second bituminous sheet is disposed substantially between one or more tabs of the second bituminous sheet.

5. The roofing shingle of claim 1, wherein at least one of the one or more slits not covered by the second bituminous sheet is disposed at least 3 cm from any lateral edge of a notch of the second bituminous sheet.

6. The roofing shingle of claim 1, wherein at least one of the one or more slits not covered by the second bituminous sheet is disposed within 5 millimeters of a lateral edge of a notch of the second bituminous sheet.

7. The roofing shingle of claim 6, wherein each of the one or more slits of the first bituminous sheet disposed within 5 millimeters of a lateral edge of a notch of the second bituminous sheet has a width of no more than 2 mm.

8. The roof shingle of claim 1, wherein each of the at least one slits not covered by the second bituminous sheet is aligned along a lateral edge of a notch of the second bituminous sheet.

9. The roofing shingle of claim 8, wherein each of the one or more slits of the first bituminous sheet aligned along a lateral edge of a notch of the second bituminous sheet has a width of no more than 2 mm.

10. The roofing shingle of claim 1, wherein each of the one or more slits of the first bituminous sheet not covered by the second bituminous sheet has a width of no more than 2 mm.

11. The roofing shingle of claim 1, wherein each of the one or more slits of the first bituminous sheet extends at least 2 inches from the lower edge of the first bituminous sheet toward an upper edge of the first bituminous sheet.

12. The roofing shingle of claim 1, wherein each of the one or more slits of the first bituminous sheet extends throughout the exposure zone toward the upper end of the roofing shingle.

13. The roofing shingle of claim 1, wherein each of the one or more slits of the first bituminous sheet extends toward the upper end of the roofing shingle at least as far as a closest notch of the second bituminous sheet thereto extends toward the upper end of the roofing shingle.

14. The roofing shingle of claim 1, wherein each of the one or more slits of the first bituminous sheet extends toward the upper end of the roofing shingle in the range of 0.4 to 0.8 times the distance from the lower end of the shingle to an upper edge of a closest notch of the second bituminous sheet thereto.

15. The roofing shingle of claim 14, wherein the lower edge of the second bituminous sheet does not extend beyond the lower edge of the first bituminous sheet by more than 1 cm.

16. The roofing shingle of claim 1, wherein the first bituminous sheet does not extend to the upper end of the roofing shingle.

17. The roofing shingle of claim 1, wherein the first bituminous sheet comprises in the range of 2-6 slits.

18. The roofing shingle of claim 1, wherein the one or more notches of the second bituminous sheet have a width of at least 5 centimeters.

19. The roofing shingle of claim 1, wherein the lower edge of each of the first bituminous sheet and the second bituminous sheet is within 1 cm of the lower edge of the shingle.

20. A roof comprising a roof deck having an upper end and a lower end, and a plurality of roofing shingles of claim 1, disposed thereon, the roofing shingles being disposed in a first course of a first plurality of the shingles and a second course of a second plurality of the shingles, the second course of shingles overlapping the headlap zones of the shingles of the first course of shingles, the headlap zones of the roofing shingles being disposed toward the upper end of the roof and the exposure zones of the roofing shingles being disposed toward the lower end of the roof.

21. The roof according to claim 20, wherein in each of the roofing shingles, the one or more slits of the first bituminous sheet not covered by the second bituminous sheet are not substantially visible from the ground when installed on a roof of a building.

* * * * *